(12) United States Patent
Hargreaves et al.

(10) Patent No.: US 9,395,824 B2
(45) Date of Patent: Jul. 19, 2016

(54) ACTIVE PEN WITH IMPROVED INTERFERENCE PERFORMANCE

(71) Applicant: Synaptics Incorporated, San Jose, CA (US)

(72) Inventors: Kirk Hargreaves, Sunnyvale, CA (US); Joseph Kurth Reynolds, Alviso, CA (US); Drew Harrington, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 36 days.

(21) Appl. No.: 14/320,521

(22) Filed: Jun. 30, 2014

(65) Prior Publication Data

US 2015/0109263 A1    Apr. 23, 2015

Related U.S. Application Data

(60) Provisional application No. 61/892,995, filed on Oct. 18, 2013.

(51) Int. Cl.
    *G06F 3/0354*    (2013.01)
    *G06F 3/038*     (2013.01)
    *G06F 3/044*     (2006.01)

(52) U.S. Cl.
    CPC ............ *G06F 3/03545* (2013.01); *G06F 3/038* (2013.01); *G06F 3/044* (2013.01); *G06F 2203/04101* (2013.01)

(58) Field of Classification Search
    None
    See application file for complete search history.

(56) References Cited

U.S. PATENT DOCUMENTS

| | | | | |
|---|---|---|---|---|
| 2010/0006350 A1* | 1/2010 | Elias | ............... | G06F 3/044 178/18.06 |
| 2012/0050180 A1* | 3/2012 | King | ............... | G06F 3/0416 345/173 |
| 2012/0092284 A1* | 4/2012 | Rofougaran | ......... | G06F 3/017 345/173 |
| 2012/0105362 A1* | 5/2012 | Kremin | ............ | G06F 3/03545 345/174 |
| 2013/0106797 A1* | 5/2013 | Pant | .............. | G06F 3/0383 345/179 |

FOREIGN PATENT DOCUMENTS

JP    11259220 A * 9/1999    ................ G06F 3/03

* cited by examiner

*Primary Examiner* — Kent Chang
*Assistant Examiner* — Nathan Brittingham
(74) *Attorney, Agent, or Firm* — Osha Liang LLP

(57) ABSTRACT

A processing system for an input device includes a sensor module coupled to sensor circuitry and configured to receive signals from an active pen. The processing system for an input device further includes a determination module configured to: determine, based on a signal exceeding a power threshold, that the signal is boosted, transition, in response to the signal being boosted, from a first state to a contact state, receive a contact packet from the active pen, and determine an attribute of the active pen using the contact packet.

17 Claims, 8 Drawing Sheets

ACTIVE PEN WITH IMPROVED INTERFERENCE PERFORMANCE

CROSS-REFERENCE TO RELATED APPLICATIONS

This application is a non-provisional patent application of U.S. Provisional Patent Application Ser. No. 61/892,995, filed on Oct. 18, 2013, and entitled: "Active Pen with Improved Interference Performance." Accordingly, this non-provisional patent application claims priority to U.S. Provisional Patent Application Ser. No. 61/892,995 under 35 U.S.C. §119(e). U.S. Provisional Patent Application Ser. No. 61/892,995 is hereby incorporated in its entirety.

FIELD

This invention generally relates to electronic devices.

BACKGROUND

Input devices such as imaging sensors and touch screens are used in a variety of devices including, but not limited to, cell phones, tablet computers, laptop computers, monitors, televisions, handheld gaming devices, and many other devices. Inputs devices are able to detect a large variety of inputs, and use that information to perform many different functions. One such input may be received from an active pen.

SUMMARY

In general, in one aspect, the invention relates to a processing system for an input device. The processing system comprising: a sensor module coupled to sensor circuitry and configured to receive a first signal and a second signal from an active pen; and a determination module configured to: determine, based on the first signal exceeding a power threshold, that the first signal is boosted; transition, in response to the first signal being boosted, from a first state to a contact state; receive a contact packet from the active pen; and determine an attribute of the active pen using the contact packet.

In general, in one aspect, the invention relates to a method. The method comprises: receiving a first signal and a second signal from an active pen; determining, based on the first signal exceeding a power threshold, that the first signal is boosted; transitioning, in response to the first signal being boosted, from a first state to a contact state; receiving a contact packet from the active pen; and determining an attribute of the active pen using the contact packet.

In general, in one aspect, the invention relates to an active pen. The active pen comprises: a force sensor configured to: determine a first force value at a tip of the active pen, wherein the first force value is below a force threshold; and determine a second force value at the tip of the active pen, wherein the second force value is above the force threshold; a packet engine configured to generate: a hover packet comprising an attribute of the active pen in response to the first force value being below the force threshold; and a contact packet comprising the attribute of the active pen and the second force value in response to the second force value being above the force threshold; and a transmitter configured to: transmit a first signal and a second signal; and boost, in response to the second force value being above the force threshold, a power level of the first signal for a pre-determined period.

Other aspects and advantages of the invention will be apparent from the following description and the appended claims.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Various embodiments provide a processing system, an active pen, and a method for sending an out of band signal. For example, embodiments may use an input device, such as a touch screen, to detect objects and/or signals. One of these objects may be an active pen. When the active pen determines that a user has transitioned from either not using the pen or hovering the pen to contacting a surface (e.g., touchscreen) with the pen, the active pen sends an out of band signal by boosting the power level of the transmissions sent by the pen. This out of band signal is a sign/indication to the sensor and/or device to immediately transition to contact mode.

Various embodiments provide a processing system, an input device system, and a method for improved active pen interference performance. For example, embodiments may use an input device, such as a touch screen, to detect objects and/or signals. One of these objects may be an active pen. When a sensor of the input device receives at least one signal from an active pen, the input device may calculate an interference value for the at least one of the signal, and determine an attribute of the active pen based another signal that has less interference.

Figure 1A:
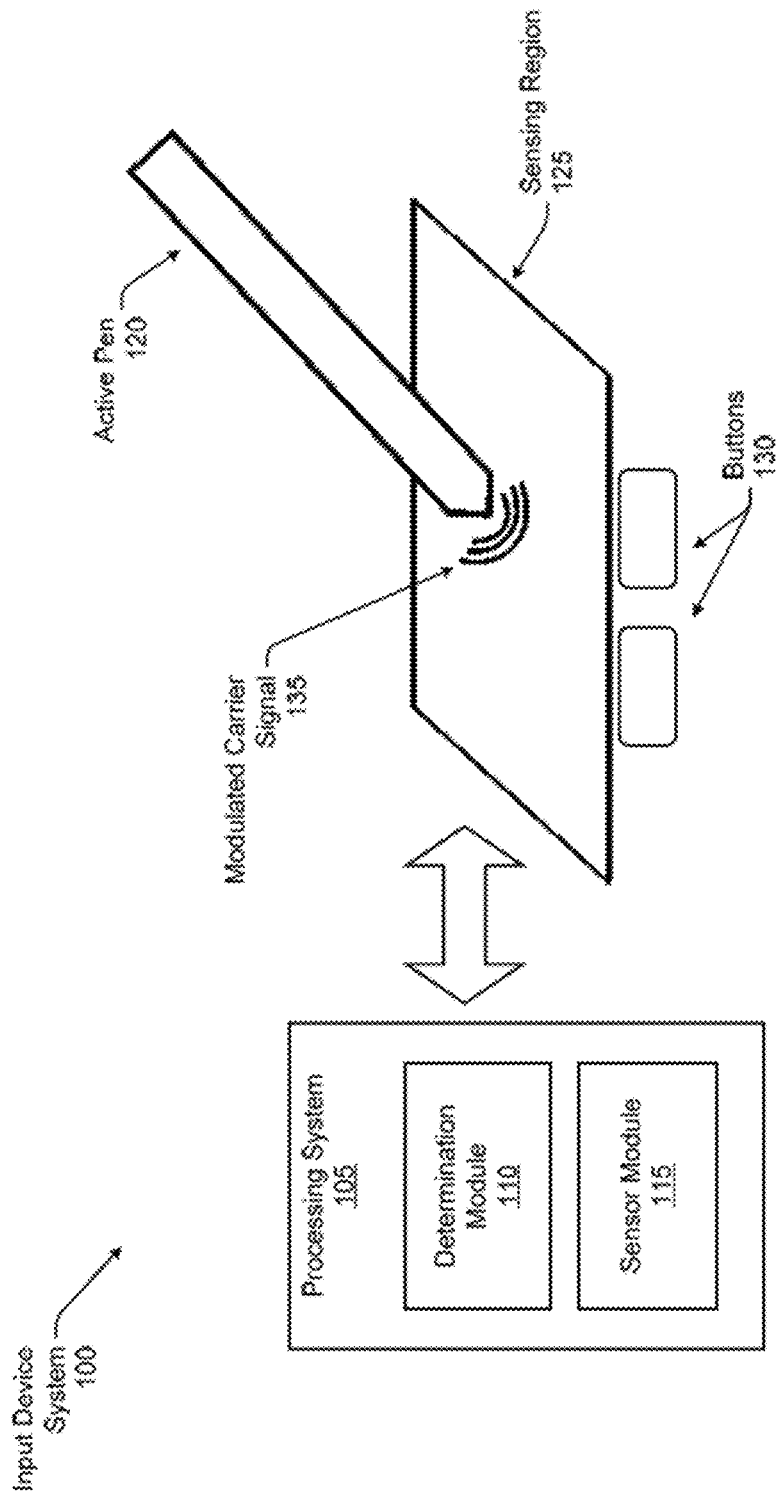
FIG. 1A shows a schematic diagram in accordance with one or more embodiments.

Turning now to the figures, FIG. 1A is a block diagram of an exemplary input device system (100), in accordance with embodiments of the invention. The input device system (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device system (100) and separate joysticks or key switches. Further example electronic systems may include peripherals such as data input devices (including remote controls and mice), and data output devices (including display screens and printers).

Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device system (100).

The input device system (100) may be implemented as a physical part of the electronic system, or may be physically separate from the electronic system. As appropriate, the input device system (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In some embodiments, input device system (100) includes an active pen (120). The active pen (120) may have one or more features including button(s), display(s), a tip force sensor, batteries, various instruments to measure motion of the active pen (120), etc. Some of the features (e.g., buttons) may be selected/operated by the user of the active pen (120). Some of the features (e.g., displays) may be used to present information to the user of the active pen (120). Some of the features (e.g., instruments of measure motion, tip force sensor) may be used to collect data on how the user is handling the active pen (120).

In some embodiments, the active pen (120) is configured to assemble a set of bits. The set of bits may represent multiple concatenated fields, with each field storing a value corresponding to a feature (e.g., button, display, tip force sensor, etc.) or a custom value. For example, one field may store a value indicating that a button on the active pen (120) has been selected by the user. Another field may store a value indicating the force at the tip of the active pen (120) (i.e., whether the user is pressing the pen firmly or lightly against a surface). In some embodiments, the set always starts with a predefined starting sequence and/or includes error detecting or error correcting codes.

In one or more embodiments, the active pen (120) may assemble multiple different sets of bits. One set of bits may be assembled when the active pen (120) determines that it is in contact with a surface. This set of bits may be referred to as a contact packet. In one or more embodiments of the invention, the contact packet may contain 8 bits for force data (such as 1 g/count or 2 g/count), 1 bit for switch/button one data, 1 bit for switch/button two data, 1 bit for auxiliary serial data (such as a start position, active pen serial number, pen battery voltage, etc.), and 3 bits for an inverted cyclic redundancy check (CRC). In one or more embodiments, a second set of bits may be assembled when the pen is in "hover mode," meaning that the pen is in use but not touching a surface with the tip of the pen. The hover packet may be shorter than the contact packet. In one or more embodiments, the hover packet is 3 bits-1 bit for switch/button one, 1 bit for switch/button two, and 1 bit for the auxiliary serial data. In one or more embodiments of the invention, the hover packet may have additional header data, to fill 10 Manchester bits (discussed below), and the 10 Manchester bit sequence may be sent twice normally, followed by twice inverted. It will be apparent to one of ordinary skill in the art that there are many ways to assemble and organize data to be sent by an active pen and, as such, the invention should not be limited to the above examples.

In one or more embodiments, the active pen (120) is configured to transmit sets of bits. Specifically, the active pen (120) may use the set of bits as a data signal to modulate a carrier signal(s), and then transmit the resulting modulated carrier signal(s) (135). The same set of bits may be retransmitted over and over. For example, the active pen (120) may modulate a carrier signal accordingly to the frequency shift keying (FSK) modulation scheme. Other modulation schemes (e.g., Amplitude Shift Keying (ASK), Quadrature Amplitude Modulation (QAM), etc.) may also be used. In one or more embodiment, the set of bits are encoded (e.g., using the Manchester encoding scheme) prior to modulating the carrier signal(s).

Figure 1B:
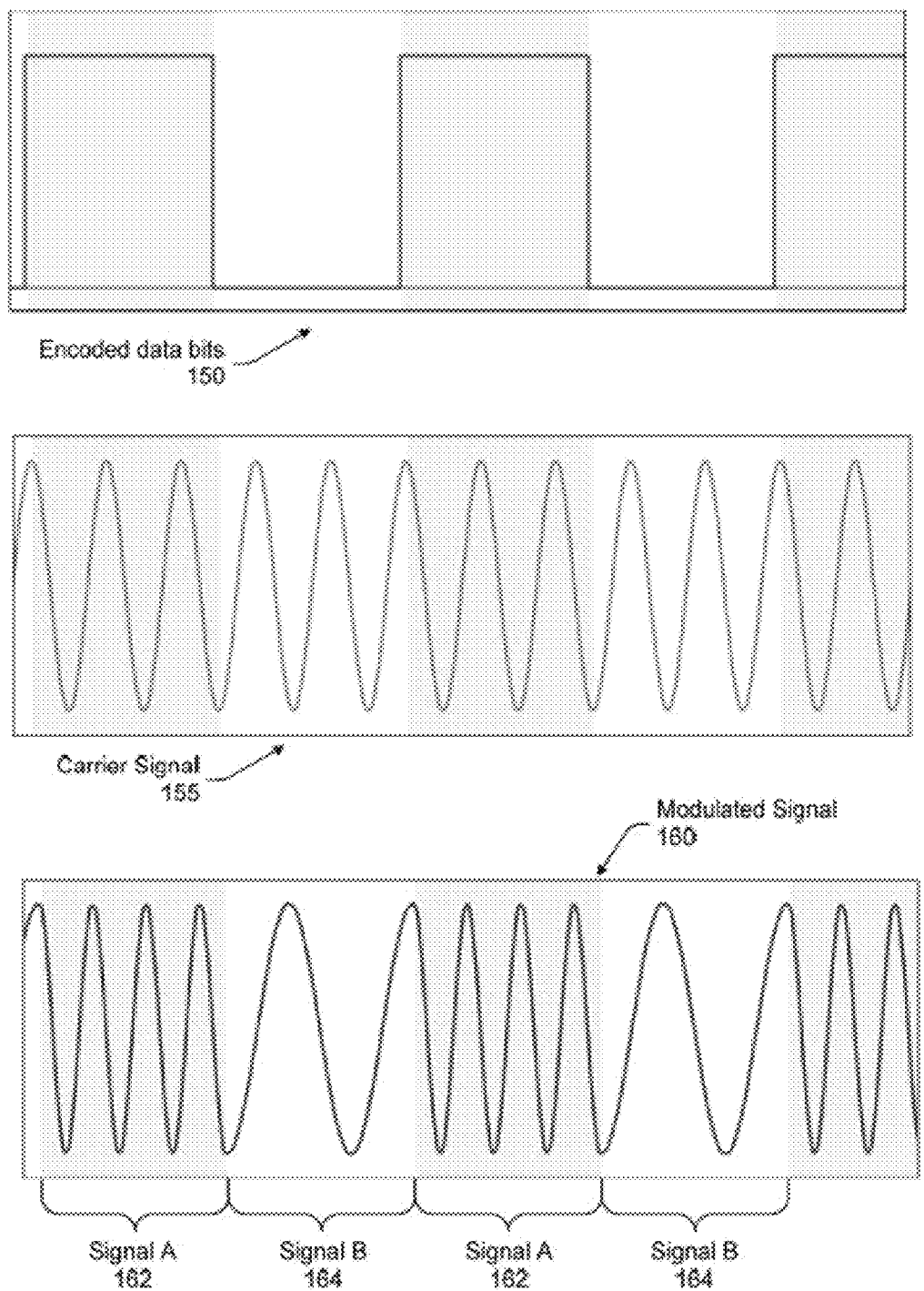
FIG. 1B shows examples of signals in accordance with one or more embodiments.

FIG. 1B shows an example of the FSK modulation scheme in accordance with one or more embodiments. As shown in FIG. 1B, there exists a set of encoded data bits (150): "10101". This set of encoded data bits (150) has been assembled by the active pen (120). As also shown in FIG. 1B, there exists a carrier signal (155). Like the encoded data bits (150), the carrier signal (155) (e.g., a sinusoidal) is also generated by the active pen (120). Moreover, the active pen (120) modulates the carrier signal (155) with the encoded data bits (150) to generate the modulated signal (160). In the FSK modulation scheme, the "1" bits may increase the frequency of the carrier signal (155), while the "0" bits may lower the frequency of the carrier signal (155). Accordingly, the frequency of the modulated signal (160) changes over time reflecting the encoded data bits (150). Specifically, the modulated signal (160) switches between a high frequency (e.g., 112.5 kHZ) and a low frequency (e.g., 83 kHz).

Those skilled in the art, having the benefit of this detailed description, will appreciate that the modulated signal (160) may be considered the sum of two ASK signals. One of the ASK signals (i.e., Signal A (162)) is generated using a carrier signal having the high frequency. The high-frequency carrier signal is present for each "1" in the encoded data bits (150) and the high-frequency carrier signal is absent for each "0" in the encoded data bits (150). In contrast, the other ASK signal (i.e., Signal B (164)) is generated using a carrier signal having the low frequency. The low-frequency carrier signal is present for each "0" in the encoded data bits (150) and the low-frequency carrier signal is absent for each "1" in the encoded data bits (150).

Returning to FIG. 1A, in one or more embodiments, active pen (120) includes functionality to determine that a force measurement/value at the tip of the active pen (120) satisfies a force threshold. The force threshold may be set to any amount, by any suitable entity, and may represent that the tip of the pen has come into contact with a surface. In one or more embodiments, satisfying the force threshold causes active pen (120) to send an out of band signal. An out of band signal is a signal that is different than the "normal" or standard signals sent by active pen (120). Specifically, the out of band signal is a signal that has a boosted power level. The voltage or power level of the boosted signal may be double, triple, 3.75×, or any other amount, more than the expected level for a signal from active pen (120). In other words, active pen (120) has a standard voltage level for a signal—"X"—the boosted signal may be thought of as "X with twice the expected voltage level" or "2X." In one or more embodiments, the boosted signal is not permanent. Rather, the boosted signal is temporary, such as the duration of 1 packet, 2 packets, etc., or may be a pre-determined period such as 50 milliseconds, half a second, 1 second, etc. In one or more embodiments, the out of band signal is used to quickly indicate to the processing system (105) that the active pen (120) is in contact with a surface. In particular, the out of band signal occurs faster than sending a contact packet, and thus allows processing system (105) to determine that active pen (120) has contacted a surface without receiving a contact packet. Those skilled in the art, having the benefit of this detailed description, will appreciate that the out of band signal may increase the voltage by any amount, and for any duration and, as such, the invention should not be limited to the above examples. Similarly, the out of band signal may comprise a reduced power level upon lifting the active pen (120) from the surface. In such an embodiment, the active pen (120) broadcasting an out of band signal having half or a third or a zero voltage level is used to quickly indicate to the processing system (105) that the pen has lifted from the surface faster than sensing a data packet.

In one or more embodiments, the input device system (100) is a proximity sensor device (also often referred to as a "touchpad", "touch screen", or a "touch sensor device") configured to sense input provided by the active pen (120) in a sensing region (125). In one or more embodiments, sensing region (125) encompasses any space above, around, in and/or near the input device system (100) in which the input device system (100) is able to detect input (e.g., input provided by active pen (120)). The sizes, shapes, and locations of particular sensing regions may vary widely from embodiment to embodiment. In some embodiments, the sensing region (125) extends from a surface of the input device system (100) in one or more directions into space until signal-to-noise ratios prevent sufficiently accurate detection. The distance to which this sensing region (125) extends in a particular direction, in various embodiments, may be on the order of less than a millimeter, millimeters, centimeters, or more, and may vary significantly with the type of sensing technology used and the accuracy desired. Thus, some embodiments sense input that includes no contact with any surfaces of the input device system (100), contact with an input surface (e.g. a touch surface) of the input device system (100), contact with an input surface of the input device system (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (125) has a rectangular shape when projected onto an input surface of the input device system (100).

The input device system (100) may utilize any combination of sensor components and sensing technologies to detect user input in the sensing region (125). The input device system (100) includes one or more sensing elements for detecting user input. As several non-limiting examples, the input device system (100) may use capacitive, elastive, resistive, inductive, magnetic, acoustic, ultrasonic, radio frequency (RF) waves, and/or optical techniques.

Some implementations are configured to provide images that span one, two, three, or higher dimensional spaces. Some implementations are configured to provide projections of input along particular axes or planes.

In some resistive implementations of the input device system (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device system (100), one or more sensing elements pick up loop currents induced by a resonating coil or pair of coils. Some combination of the magnitude, phase, and frequency of the currents may then be used to determine positional information.

In some radio frequency implementations of the input device system (100), one or more sensing elements receive/intercept/detect RF waves. In other words, the sensing elements are effectively antennas. As discussed above, the received RF waves may correspond to modulated carrier signal(s) (135) transmitted by the active pen (120) (discussed below). Multiple sensor elements may receive the same modulated carrier signal but with different strengths. These various signal strengths and/or the data transmitted in the modulated carrier signal may be used to determine positional information.

In some capacitive implementations of the input device system (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may include effect(s) corresponding to one or more transmitter signals, and/or to one or more sources of environmental interference (e.g. other electromagnetic signals). Sensor electrodes may be dedicated transmitters or receivers, or may be configured to both transmit and receive.

Some optical techniques utilize optical sensing elements (e.g., optical transmitters and optical receivers). Such optical transmitters transmit optical transmitter signals. The optical receivers include functionality to receive resulting signals from the optical transmitter signals. A resulting signal may include effect(s) corresponding to one or more transmitter signals, one or more active pen (120) in the sensing region, and/or to one or more sources of environmental interference. For example, the optical transmitters may correspond to a light emitting diode (LED), organic LED (OLED), light bulb, or other optical transmitting component. In one or more embodiments, the optical transmitter signals are transmitted on the infrared spectrum.

In FIG. 1A, a processing system (105) is shown as part of the input device system (100). The processing system (105) is configured to operate the hardware of the input device system (100) to detect input in the sensing region (125). The processing system (105) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes). In some embodiments, the processing system (105) also includes electronically-readable instructions, such as firmware code, software code, and/or the like. In some embodiments, components composing the processing system (105) are located together, such as near sensing element(s) of the input device system (100). In other embodiments, components of processing system (105) are physically separate with one or more components close to sensing element(s) of input device system (100), and one or more components elsewhere. For example, the input device system (100) may be a peripheral coupled to a desktop computer, and the processing system (105) may include software configured to run on a central processing unit of the desktop computer and one or more ICs (perhaps with associated firmware) separate from the central processing unit. As another example, the input device system (100) may be physically integrated in a phone, and the processing system (105) may include circuits and firmware that are part of a main processor of the phone. In some embodiments, the processing system (105) is dedicated to implementing the input device system (100). In other embodiments, the processing system (105) also performs other functions, such as operating display screens, driving haptic actuators, etc.

The processing system (105) may be implemented as a set of modules that handle different functions of the processing system (105). Each module may include circuitry that is a part of the processing system (105), firmware, software, or a combination thereof. In various embodiments, different combinations of modules may be used. For example, as shown in FIG. 1A, the processing system (105) may include a determination module (110) and a sensor module (115).

In some embodiments, determination module (110) includes functionality to determine when the active pen (120) is present. Specifically, the determination module (110) may calculate the power of any signal (e.g., modulated carrier signal (135)) received by one or more of the sensors, and determine the active pen (120) is present if the calculated power exceeds a predetermined power threshold. Further, the determination module (110) also includes functionality to determine if a boosted signal has been sent by, for example, determining if a boosted power threshold is satisfied. The boosted power threshold may be set to any amount, such as 2×, 3×, 4× the power threshold for determining the presence of an active pen.

As discussed above, the modulated carrier signal (135) is created by modulating a carrier signal(s) with a set of bits. In one or more embodiments, the determination module (110) is configured to reconstruct the set of bits from the received modulated carrier signal (135). In other words, the determination module (110) is configured to demodulate the received modulated carrier signal (135). As the same set of bits may be transmitted over and over by the active pen (120), the same set of bits may be reconstructed over and over by the determination module (110).

In one or more embodiments, the modulated carrier signal (135) is the result of the FSK modulation scheme. Accordingly, as discussed above, the modulated carrier signal (135) may be considered the sum of two ASK signals. The determination module (110) may use a two-channel receiver configuration to recover the set of bits from the modulated carrier signal (135), with each channel corresponding to one of either the high frequency or the low frequency. Those skilled in the art, having the benefit of this detailed description, will appreciate that it is possible to reconstruct the set of bits by using both channels or by using a single channel (discussed below).

In one or more embodiments, the modulated carrier signal (135) is subject to interference from any number of sources that possibly vary over time. However, not all interference is identical. Some interference is frequency specific and thus might only affect components in the modulated carrier signal (135) that are within a specific frequency range. There may be little impact on components the modulated carrier signal (135) that fall outside of the frequency range. Accordingly, in embodiments utilizing FSK modulation, during some time intervals only one channel may be suffering from interference.

As discussed above, the subset of bits (e.g. terminal bits) of the set of bits assembled by the active pen (120) may be used for error detection codes. When a single channel of the receiver is used to reconstruct the set of bits, the determination module (110) may periodically check for errors in the reconstructed bits using the error detection codes. A high number of errors may indicate that the channel is experiencing high levels of levels of interference. Similarly, a low number of errors may indicate that the channel is experiencing low levels of interference. Moreover, the number of detected errors may be used to calculate an interference value for the channel. An interference value may be calculated for each channel (and thus signal). In one or more embodiments, if the interference value for a channel satisfies an interference metric indicating high interference, the determination module (110) may reconstruct the transmitted bits from the other channel.

In some embodiments, determination module (110) includes further functionality to determine attributes of active pen (120), such as force data, switch/button states, from the received packets. The determination module (110) may also determine positional information of the active pen (120). As discussed above, the sensing region (125) may include multiple sensors, and each sensor may receive the modulated carrier signal (135) with different strengths. The positional information of the active pen (120) may be determined using the relative strengths of the received modulated carrier signal (135). Additionally or alternatively, the positional information of the active pen (120) may be determined using the relative strengths of the channel (and thus signal) being used for bit reconstruction. In other words, the signal experiencing the high interference may be filtered out, and the positional information may be recovered from the other signal following its demodulation.

In one or more embodiments, the processing system (105) transitions between various states (e.g., sleep, hover, contact, etc.) depending on packets and/or the power-levels of signals received from the active pen (120). In sleep state, the active pen is not transmitting any data, while processing system (105) is listening for the presence of an active pen (120). Sleep state may be reached based on a time of inactivity of the active pen (120). In hover state, the active pen sends hover data packets, while processing system (105) reports button data. Hover state is enabled when there is low force on the pen tip, but there is button or other activity detected on the active pen (120). Finally, in contact state, the active pen is transmitting contact packets, while the processing system is reporting position, force, and additional data. The reporting in the contact state may occur much more frequently than the reporting in the hover state or sleep state. Contact mode is enabled based on high force on the pen tip. In one or more embodiments, there are additional temporary states, which will be discussed in more detail with regards to FIG. 2A.

The sensor module (115) may include functionality to drive the sensing elements to transmit transmitter signals and receive resulting signals. For example, the sensor module (115) may include sensory circuitry that is coupled to the sensing elements. The sensor module (115) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1A shows only a determination module (110) and a sensor module (115), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures such as mode changing gestures, and mode changing modules for changing operation modes.

In some embodiments, the processing system (105) responds to user input (or lack of user input) in the sensing region (125) (including signals received from active pen (120), etc.) directly by causing one or more actions. Example actions include changing operating modes, as well as GUI actions such as cursor movement, selection, menu navigation, and other functions. In some embodiments, the processing system (105) provides information about the input (e.g., the reconstructed bits) to some part of the electronic system (e.g. to a central processing system of the electronic system that is separate from the processing system (105), if such a separate central processing system exists). In some embodiments, some part of the electronic system processes information (e.g., the reconstructed bits) received from the processing system (105) to act on user input, such as to facilitate a full range of actions, including mode changing actions and GUI actions.

For example, in some embodiments, the processing system (105) operates the sensing element(s) of the input device system (100) to produce electrical signals indicative of input (or lack of input) in the sensing region (125). The processing system (105) may perform any appropriate amount of processing on the electrical signals in producing the information provided to the electronic system. For example, the processing system (105) may digitize analog electrical signals obtained from the sensor electrodes. As another example, the processing system (105) may perform filtering or other signal conditioning. As yet another example, the processing system (105) may subtract or otherwise account for a baseline, such that the information reflects a difference between the electrical signals and the baseline. As yet further examples, the processing system (105) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Continuing with FIG. 1A, in some embodiments, the input device system (100) is implemented with additional input components that are operated by the processing system (105) or by some other processing system. These additional input components may provide redundant functionality for input in the sensing region (125), or some other functionality. FIG. 1 shows buttons (130) near the sensing region (125) that may be used to facilitate selection of items using the input device system (100). Other types of additional input components include sliders, balls, wheels, switches, and the like. Conversely, in some embodiments, the input device system (100) may be implemented with no other input components.

In some embodiments, the input device system (100) includes a touch screen interface, and the sensing region (125) overlaps at least part of an active area of a display screen. For example, the input device system (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device system (100) and the display screen may share physical elements. For example, some embodiments may utilize some of the same electrical components for displaying and sensing. As another example, the display screen may be operated in part or in total by the processing system (105).

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system (105)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

In one embodiment, a first set of sensor electrodes are arranged in a first direction, and a second set of sensor electrodes are arranged in a second direction substantially perpendicular to the first direction. It will be appreciated, however, that in various embodiments, a variety of sensor electrode pattern—including ones that vary in sensor electrode layout, size, shape, number, material, and the like—may be suitable in various embodiments.

Each of the first set of sensor electrodes may be ohmically isolated from each of the second set of sensor electrodes. In some embodiments, the first set and second set of sensor electrodes are disposed as a single layer of conductive material on a substrate that are connected by electrical jumpers as appropriate; the sensor electrodes of the first and second sets are separated from each other by local dispositions of insulative material disposed between the regions where the sensor electrodes of the first and second sets overlap each other. The insulative material may comprise one or more patches of insulative material that are printed, sputtered, or otherwise patterned. In some embodiments, the first and second sets of sensor electrodes are separated by one or more substrates. For example, the sensor electrodes of the first set of sensor electrodes may be disposed on a first surface of a substrate, and the sensor electrodes of the second set of sensor electrode may be disposed on a second, opposite surface of the same substrate. In other embodiments, the first and second sensor electrodes may be patterned on the same layer of a substrate. In such embodiments, the sensor electrodes do not cross over each other in the sensing region; any connections may be made in a border region, outside the sensing region. Further, in such an embodiment, various sensor electrode patterns and shapes may be used, each having various numbers of first and second sensor electrodes. As another example, the first and second sets of sensor electrodes may be disposed on different substrates that are laminated together.

In one embodiment, the sensor electrodes are constructed from opaque or substantially opaque conductive materials. In other embodiments, sensor electrodes are constructed in whole or in part from substantially transparent conductive material, such as patterned ITO, ATO, carbon nanotubes, or other substantially transparent materials.

In one embodiment, a first set of sensor electrodes are configured as receiver electrodes, and a second set of sensor electrodes are configured as transmitter electrodes. That is, the first and second sensor electrodes are communicatively coupled with a processing system that operates them to receive or transmit as appropriate. In some embodiments, the first and second sensor electrodes are also shaped for better performance as receiver or transmitter electrodes. The capacitive coupling between the transmitter electrodes and receiver electrodes change with input near the sensing region associated with sensor device. Referring again to FIG. 1A, a processing system (105) is shown as part of input device system (100). The processing system (105) is configured to operate the hardware of input device system (100) (including, for example, the various sensor electrodes) to detect input in the sensing region (125). The processing system (105) comprises parts of or all of one or more integrated circuits (ICs) and/or other circuitry components. For example, as described in further detail below, a processing system for a mutual capacitance sensor device may comprise transmitter circuitry configured to transmit signals with transmitter sensor electrodes, and/or receiver circuitry configured to receive signals with receiver sensor electrodes).

Although not shown in FIG. 1A, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 2A:
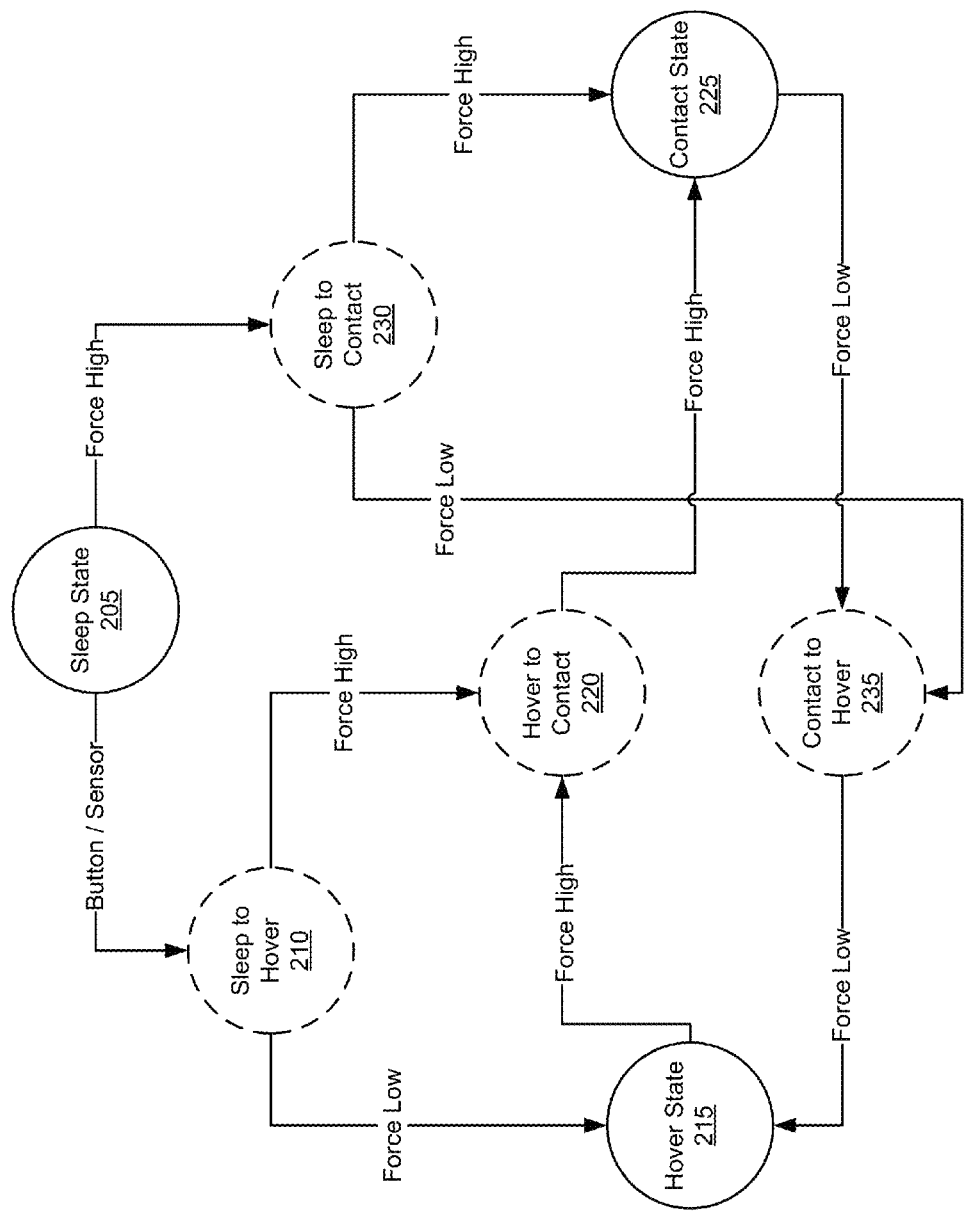
FIGS. 2A and 2B show diagrams in accordance with one or more embodiments.

FIG. 2A shows a diagram in accordance with one or more embodiments. Specifically, FIG. 2A shows the different states of the processing system and/or active pen and the trigger(s) for transitioning between states. Sleep state (205) is an inactive state that may be reached based on a period of inactivity of the active pen. The period of inactivity may be of any duration, and may be set by the user, manufacturer, or other suitable entity. A transition out of sleep state (205) may be caused by the active pen detecting button and/or sensor activity, which causes a transition to the temporary state (as indicated by the dotted line) of sleep to hover (210), or by the active pen detecting high force on the pen tip, which causes a transition to the temporary state (as indicated by the dotted line) of sleep to contact (230).

In one or more embodiments, during the temporary state of sleep to hover (210), the active pen sends hover packets, and the sensor wakes up and reports the button data. If the active pen is reporting low force on the pen tip during sleep to hover (210), the state is transitioned to hover state (215). If the active pen is reporting high force on the pen tip during sleep to hover (210), then the state is transitioned to temporary state (as indicated by the dotted line) of hover to contact (220).

In one or more embodiments, hover state (215) occurs when the pen is hovering (i.e., there is low force on the pen tip, but there is button and/or sensor activity). A transition out of hover state (215) may occur if there is a period of inactivity, returning the pen to sleep state (205), or may occur if high force is detected on the pen tip, transitioning the state to the temporary state of hover to contact (220).

In one or more embodiments, hover to contact (220) is a temporary state that occurs when the active pen was hovering, but subsequently received high force on the pen tip. In hover to contact mode (220), the active pen boosts the transmitted signal, which may contain contact packets, while the sensor quickly reports that there has been contact with a surface. Continued high force on the pen tip results in a transition to contact state (225).

In one or more embodiments, contact state (225) occurs when the active pen is in contact with a surface. In contact state (225), the active pen is sending contact packets, while the sensor is reporting position, force, and other data. The reporting is happening much more frequently than the reporting in the hover state (215). A transition out of contact state (225) may occur if there is low force on the pen tip, resulting in a transition to the temporary state (as indicated by the dotted lines) of contact to hover (235).

In one or more embodiments, contact to hover (235) is a temporary state that occurs when the active pen was in contact mode, but is no longer reporting high force on the pen tip. In other words, the active pen has been removed from the surface it was previously touching. In contact to hover (235), the active pen sends hover packets, while the sensor ceases to report position data quickly. Continued low force on the pen tip results in a transition to hover state (215).

In one or more embodiments, sleep to contact (230) is a temporary state that occurs when the active pen was previously asleep, but has now detected high force on the pen tip. In sleep to contact (230), the active pen boosts the transmitted signal, which may contain low frequency or zero data packets, while the sensor wakes up and quickly acquires the position of the active pen.

Figure 2B:
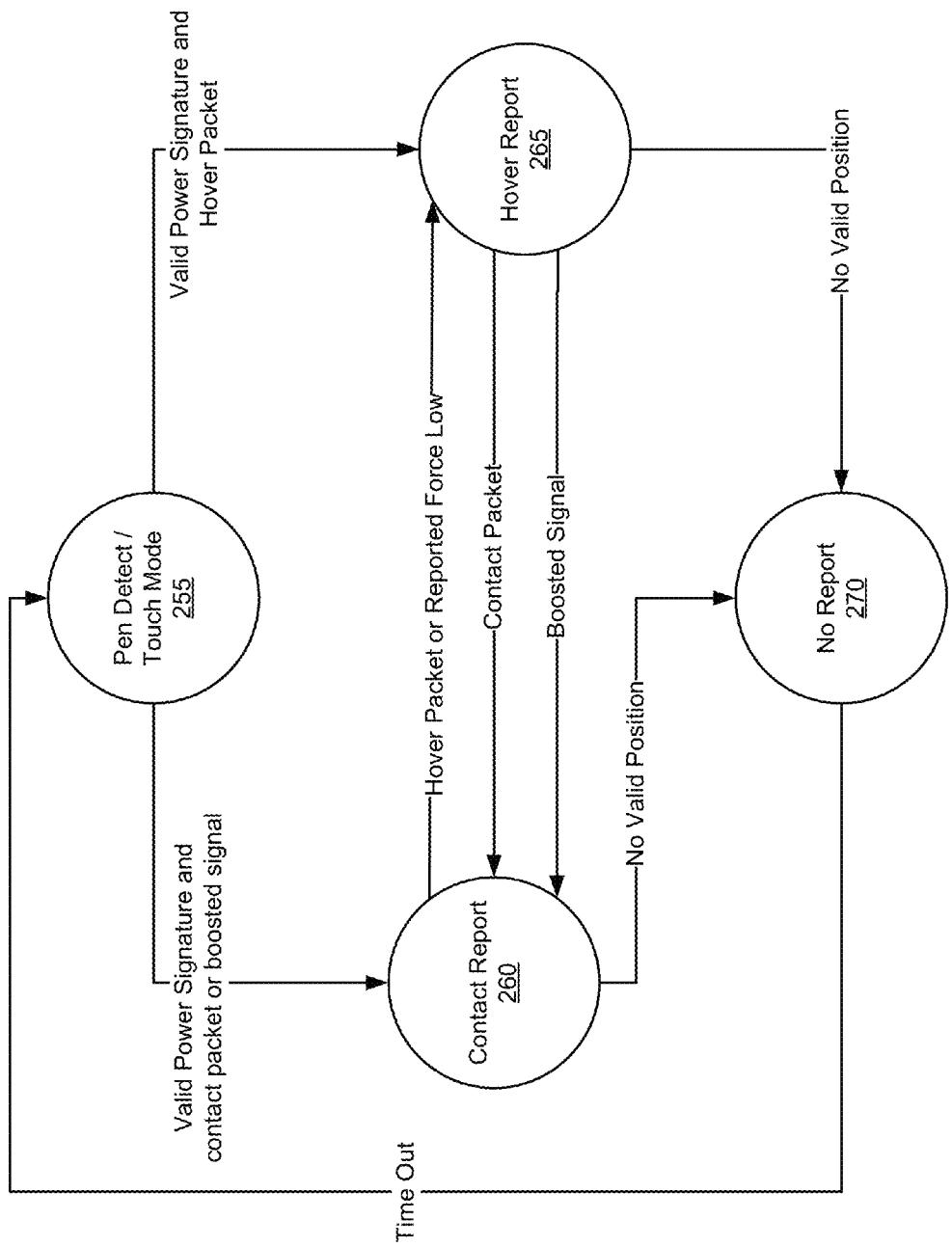

FIG. 2B shows a diagram in accordance with one or more embodiments. Specifically, FIG. 2B shows potential reports issued by the sensor and/or processing system. Pen detect/touch mode (PDTM) (255) occurs when an active pen has not been detected. In PDTM (255), the sensor waits for an active pen to appear, by listening for the active pen, and matching signals to the expected power, code, frequencies, etc., of an active pen. When a valid power signal and a hover packet are received by the sensor, the sensor issues a hover report (265) to the device. Hover report (265) indicates to the device that an active pen is present and hovering. Moreover, the hover report (265) may include one or more attributes of the active pen that have been extracted from received hover packets. If a contact packet, and/or a boosted signal is received, then the sensor issues a contact report (260). The contact report (260) is an indication that the active pen is in contact with a surface. Moreover, the hover report (265) may include one or more attributes of the active pen and the force value measured by the active pen, as extracted from the received contact packet(s). Alternatively, if no valid position is determined, the sensor issues no report (270). No report (270) may occur, for example, when a palm is detected on the sensor when an active pen is also reporting. When no report (270) is issued, if a time out occurs the sensor returns to PDTM (255).

Figure 3A:
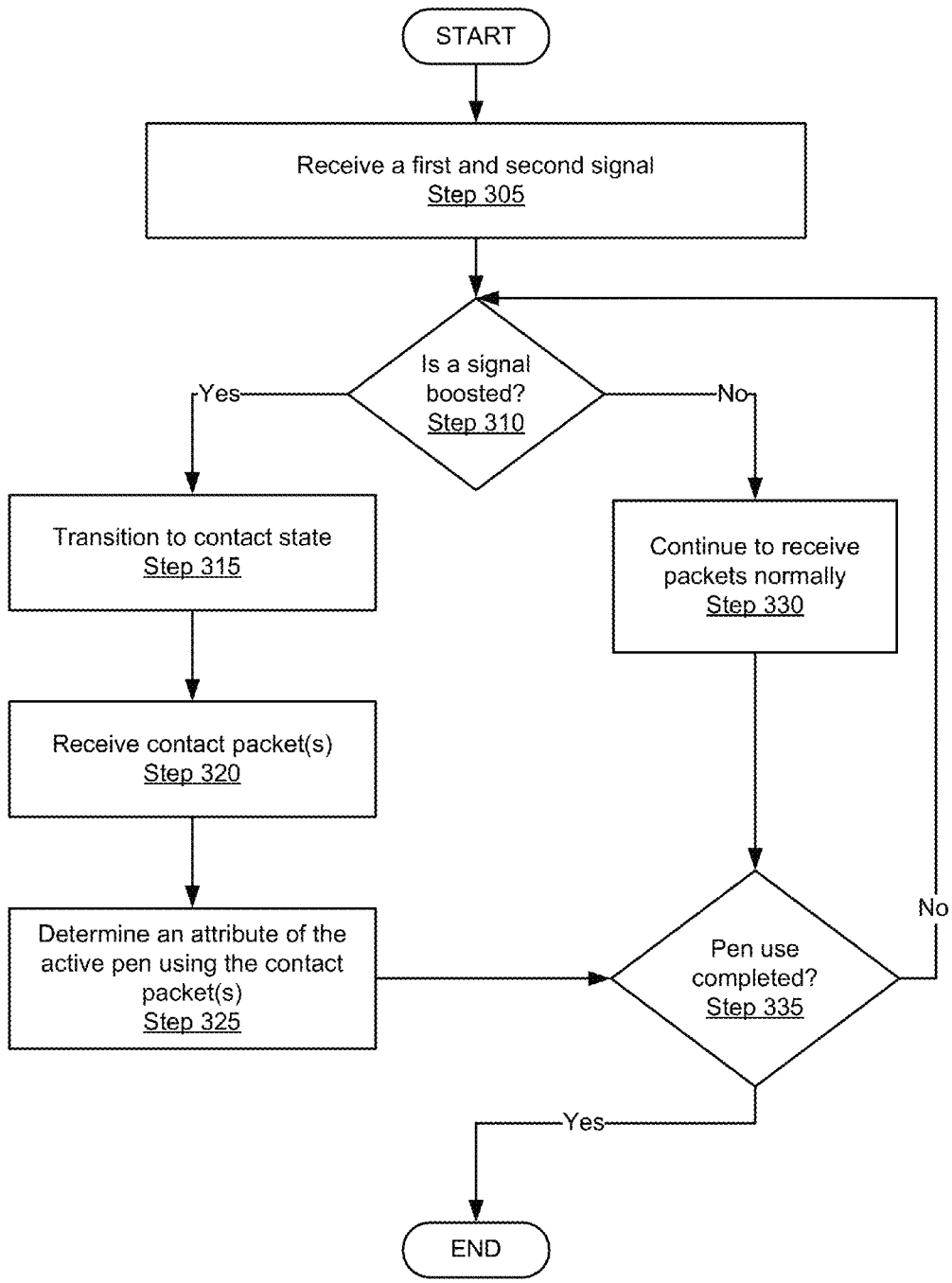
FIGS. 3A and 3B show flowcharts in accordance with one or more embodiments.
Figure 3B:
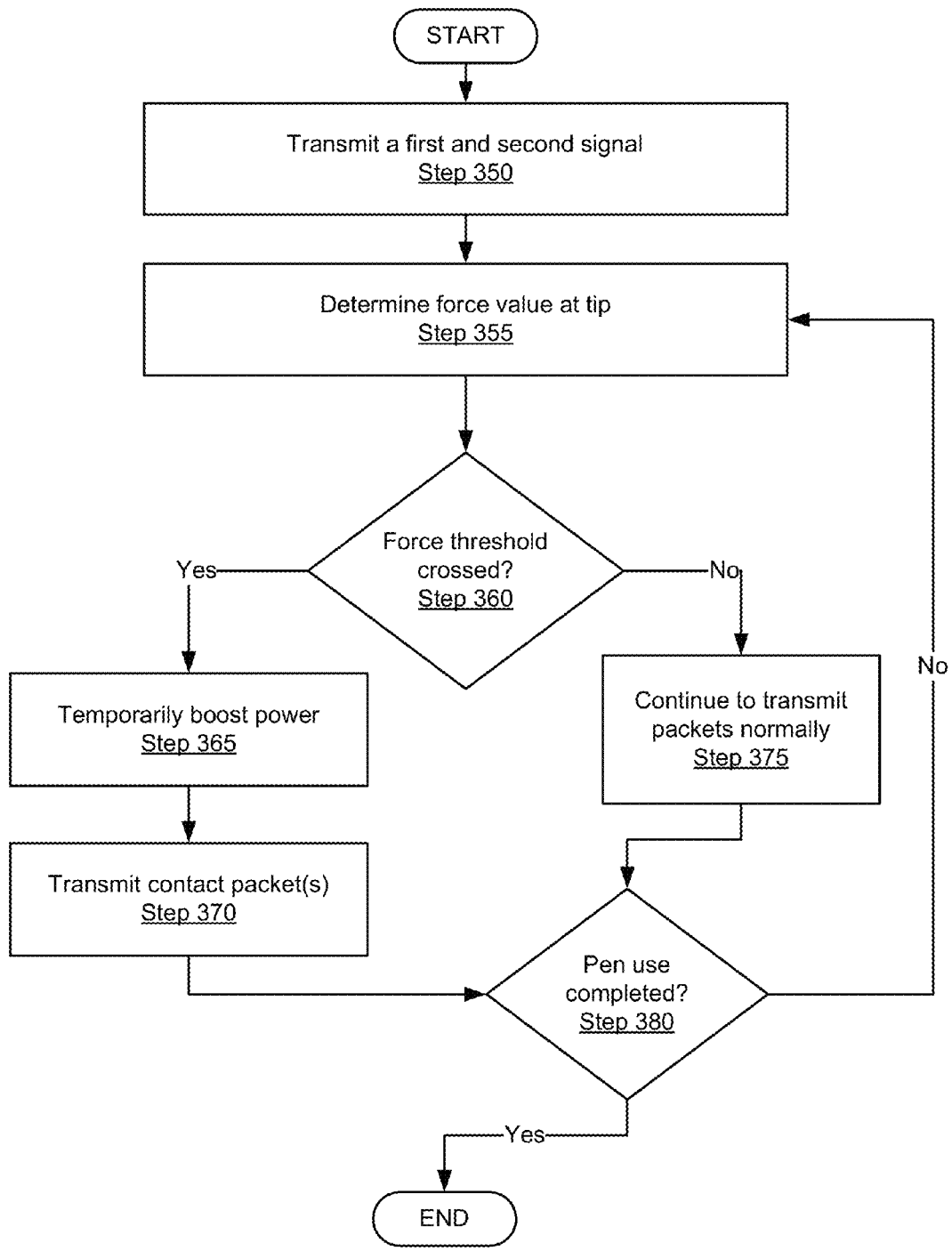

FIGS. 3A and 3B show flowcharts depicting a method for receiving and sending an out of band signal. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIGS. 3A and 3B should not be construed as limiting the scope of the invention.

Specifically, in FIG. 3A, a method for receiving an out of band signal is shown. Initially, in Step 305, a first and second signal are received, in accordance with one or more embodiments. The first and second signal may be received at different frequencies, and may contain the same (or different) data. The first and second signal may be encoded or transmitted using any manner now known or later developed, and may contain any data. In one or more embodiments of the invention, the first and second signal have a pre-determined voltage level which the sensor is expecting.

In Step 310, a determination is made whether the signal is boosted, in accordance with one or more embodiments. The signal may be boosted by any suitable amount of the expected voltage level, such as 2×, 3×, 4.5×, etc. The determination may be made by comparing the voltage (or power-level) of the first or second signal to an expected voltage level, or by any other method now known or later developed. If the signal is not boosted, the method proceeds to Step 330. If the signal is boosted, the method proceeds to Step 315.

In Step 315, the processing system and/or pen transitions to the contact state, in accordance with one or more embodiments. The transitioning is in response to receiving the boosted signal. Specifically, the boosted signal is a prompt indication that the active pen is in contact with a surface even. The boosted signal may be detected before a contact packet is received. This allows the sensor and/or device to have a faster response time and determine the positional information of the active pen. For example, if the active pen is used for a writing program, the device may begin writing even before receiving a contact packet indicating how much force the pen tip is experiencing. The device may guess at the force level of the pen tip by using a preset amount, or may base the guess on prior usage of the pen. Then, when the contact packet finally arrives, the correct force level may be backfilled.

In Step 320, contact packets are received, in accordance with one or more embodiments. The contact packets may be received using the first and/or second signal, and may be received in any manner now known or later developed. The contact packets may be in any suitable format.

In Step 325, an attribute of the active pen is determined using the contact packet(s), in accordance with one or more embodiments. The attribute of the active pen may be any information contained in a contact packet In Step 330, packets are continued to be received normally, in accordance with one or more embodiments. In Step 335, a determination is made whether the use of the pen is completed, in accordance with one or more embodiments. The determination may be made in any manner now known or later developed, such as waiting for a period of inactivity to cause the active pen to time out. If the use of the pen is not completed, the method returns to Step 310. If the use of the pen is completed, the method may end.

Turning to FIG. 3B, a method for sending an out of band signal is shown. Initially, in Step 350, a first and second signal are transmitted, in accordance with one or more embodiments. The signals may be transmitted in any manner now known or later developed, and may use any type of encoding. The first and second signal may contain the same, or different data. The first and second signals may be segments of a carrier signal modulated using frequency shift keying (FSK). In one or more embodiments, Step 350 is performed continuously while the active pen is in use.

In Step 355, a force value at the tip is determined, in accordance with one or more embodiments. The force at the tip of the pen may be determined in any manner now known or later developed. The force may be any suitable value.

In Step 360, a determination is made whether a force threshold has been crossed, in accordance with one or more embodiments. The determination may be made in any manner now known or later developed. The force threshold may be set to any amount by user, manufacturer, or other suitable entity. Satisfying the force threshold may indicate that the pen tip is in contact with a surface. If the force threshold has not been crossed, the method proceeds to Step 375. If the force threshold is crossed, then the method proceeds to Step 365.

In Step 365, the power used to transmit the first and/or second signal is temporarily boosted, in accordance with one or more embodiments. The power may be boosted by a factor of 2, 3, 4.75, etc. The power may be boosted for the duration it takes to send a single packet, two packets, etc. Alternatively, the power may be boosted for a pre-determined period, such as 90 milliseconds, half a second, 1 second, etc.

In Step 370, contact packets are transmitted, in accordance with one or more embodiments. The contact packets may be transmitted in any manner now known or later developed. In one or more embodiments, one or more of the contact packets may be transmitted while the signal is boosted. Alternatively, the contact packets may not be transmitted until after the signal is no longer boosted.

In Step 380, a determination is made whether the use of the pen is completed, in accordance with one or more embodiments. The determination may be made in any manner now known or later developed, such as waiting for a period of inactivity to cause the active pen to time out. If the use of the pen is not completed, the method returns to Step 355. If the use of the pen is completed, the method may end.

In Step 375, packets are continued to be transmitted normally, in accordance with one or more embodiments. After Step 375, the method continues to Step 380.

Figure 4A:
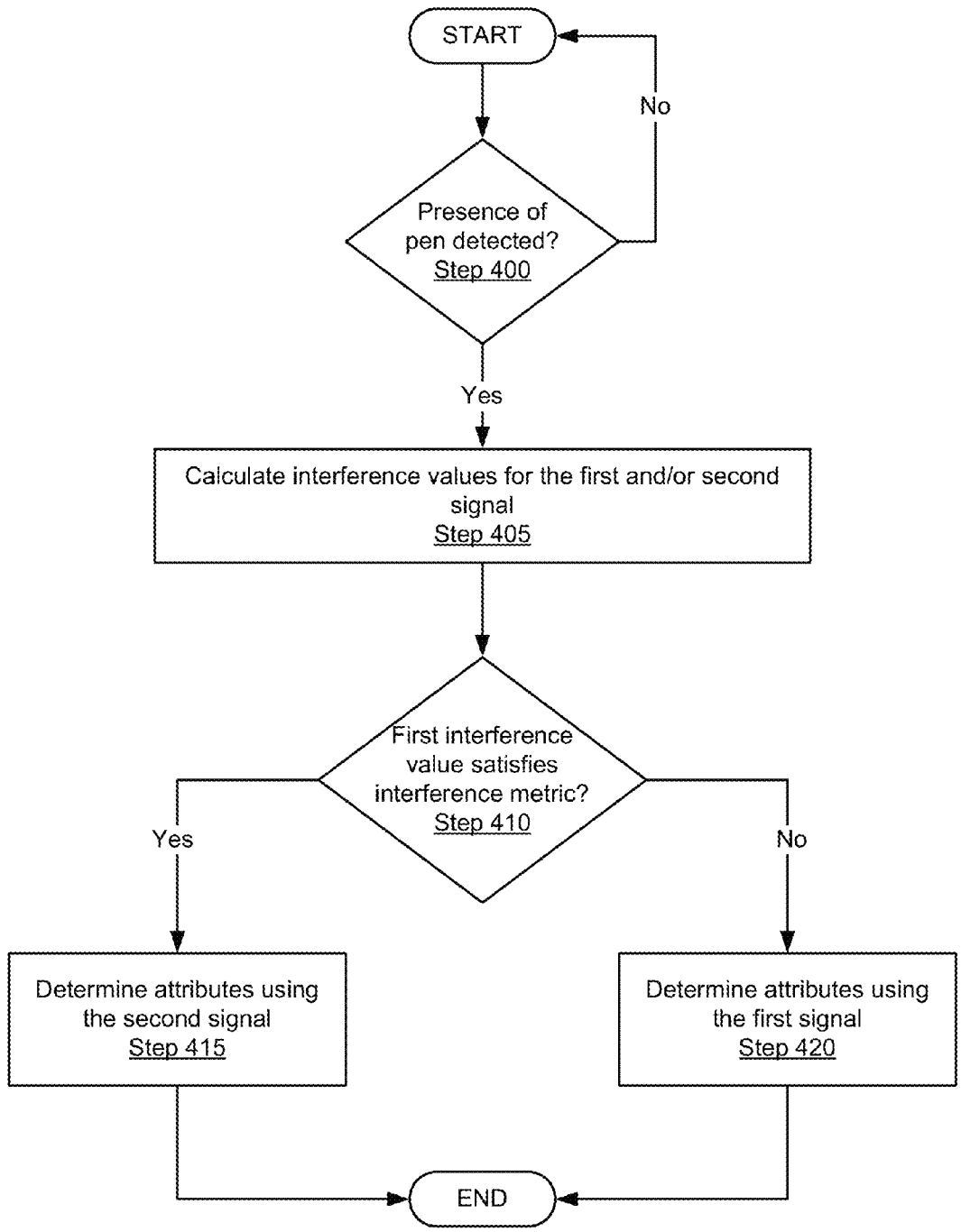
FIGS. 4A and 4B show flowcharts in accordance with one or more embodiments.
Figure 4B:
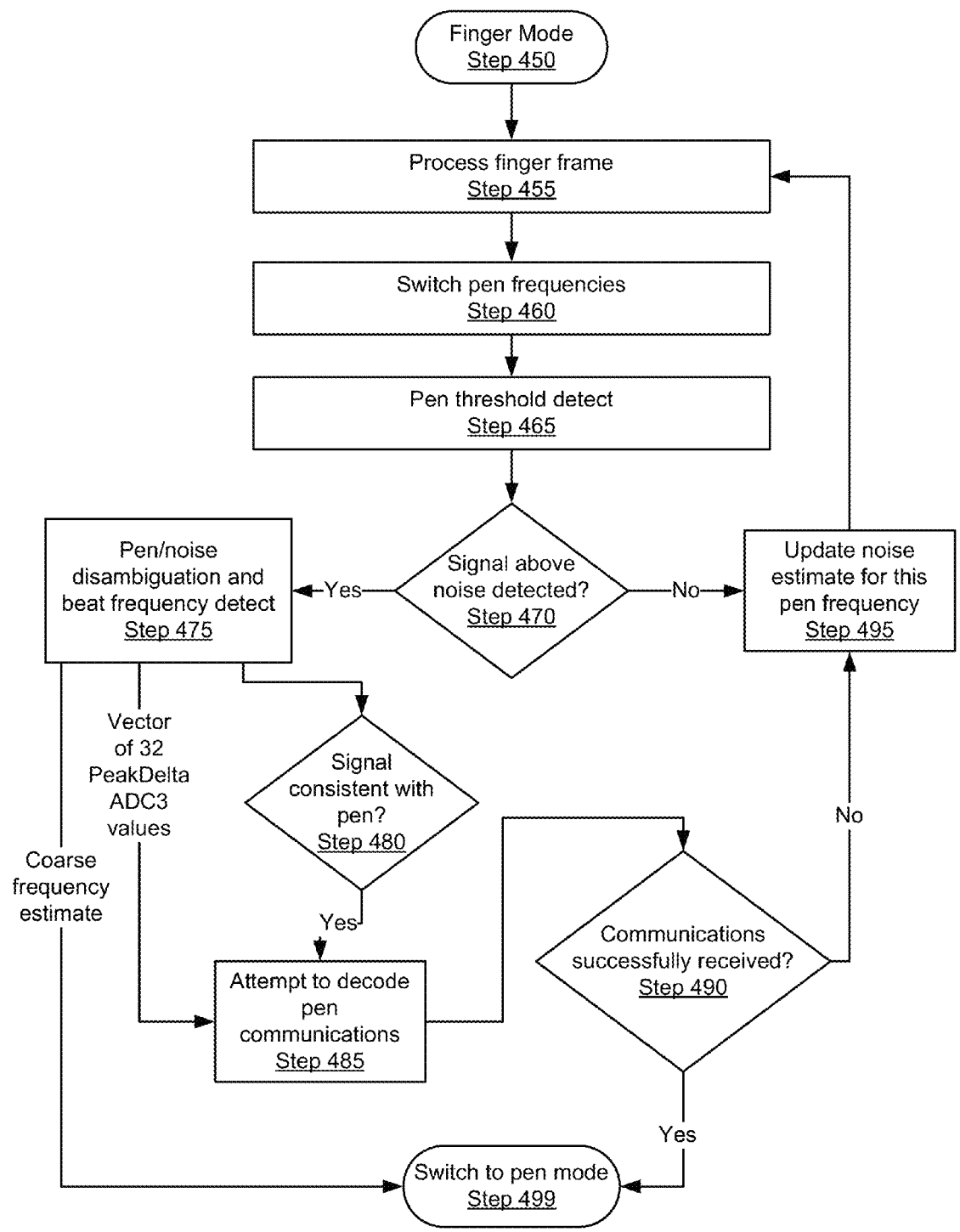

FIGS. 4A and 4B show a flowchart depicting a method for operating an input device. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIGS. 4A and 4B should not be construed as limiting the scope of the invention.

In Step 400, a determination is made whether an active pen has been detected, in accordance with one or more embodiments. If the pen has not been detected, the method waits. If a pen has been detected, then the method continues on to Step 405.

As discussed above, the active pen transmits one or more modulated carrier signals. The pen may be detected by measuring the power of any received signals. For example, if the measured power exceeds a power threshold, it may be assumed that an active pen is present.

In one or more embodiments, the modulated carrier signal(s) is effectively transmitting a set of bits. The initial bits in the set may correspond to a staring sequence or starting condition. The identification of this starting sequence may be used to detect the active pen is present.

As also discussed above, the transmitted modulated signal(s) may be composed of different signals, each having a different frequency. For example, in the embodiments involving FSK modulation, the pen may broadcast a modulated signal composed of two signals: one having a frequency of approximately 83 kHz, and one having a frequency of approximately 112.5 kHz.

In Step 405, an interference value is calculated for at least one of the first and second signal, in accordance with one or more embodiments. Interference is often frequency specific. In other words, for a given source of interference, some signals within a specific frequency range may be affected by the source of interference, while signals outside the frequency range might not be affected. The interference value of a signal reflects the interference being experience by the signal. As discussed above, an interference value may be calculated using error detecting codes in the transmitted set of bits.

In Step 410, a determination is made whether the first interference value (i.e., the interference value for the first signal) satisfies the interference metric, in accordance with one or more embodiments. The interference metric may be any suitable amount. In one or more embodiments, the interference metric is set by the manufacturer or the software developer. Alternatively, the interference metric may be set by any other suitable party, such as the end user, the retailer, etc. In one or more embodiments, the determination may be made whether the second interference value (i.e., the interference value for the second signal) satisfies the interference metric, rather than the first. Further still, in one or more embodiments, the first and second interference values may be compared to each other, rather than to the interference metric. In that example, the signal with the least interference may be selected. In some embodiments, the active pen broadcasts at two different frequencies consistently, and the input device switches between the frequencies when one frequency is deemed to not meet an interference condition.

In Step 415, one or more attributes for the active pen are determined using the second signal, in accordance with one or more embodiments. In other words, the first signal is filtered out, the (hover, contact) packets are reconstructed from the second signal, and the attributes are extracted from the received packets. After Step 415, the method may end.

In Step 420, positional information for the active pen is determined using the first signal, in accordance with one or more embodiments. The positional information may be determined as explained in Step 415, except that the first signal is the signal being used in Step 420, rather than the second signal, as in Step 415. After Step 420, the method may end.

In one or more embodiments, interference for all of the signals sent by the active pen may be constantly measured. Alternatively, the measurement may occur at predetermined intervals, or using any other suitable standard. Further, the signal with the least interference may be selected dynamically. In other words, the signal being used to determine the positional information maybe change in real time dependent on the amount of interference present in the various signals sent by the active pen.

It will be apparent to one of ordinary skill in the art that, the method enables the active pen to be "dumb." That is, the active pen does not know which signal or signals are being used to reconstruct the set of bits and/or determine the positional information. Rather, the active pen transmits the same signals regardless of the type of interference present.

Turning to FIG. 4B, initially, in Step 450 an input device is in finger mode, in accordance with one or more embodiments. Finger mode is used when there is no active pen detected.

In Step 455, a finger frame is processed, in accordance with one or more embodiments. The finger frame may be processed in any manner now known or later developed.

In Step 460, pen frequencies are switched, in accordance with one or more embodiments. Specifically, the sensor device may switch from attempting to detect an active pen on a first frequency to a second frequency, which may align with the first and second signals discussed in the prior figures.

In Step 465, pen threshold detect is performed, in accordance with one or more embodiments. Pen Threshold Detect is performed where the input device collects approx. 5 samples, or otherwise spends 0.5 milliseconds and calculates the power of the received signal (e.g. by calculating an RMS or absolute deviation). In some embodiments, the input device alternates between frequencies, from a first to a second frequency (or a second to a first frequency), during pen threshold detect. The sensor device may adjust the power threshold to determine that a pen is present based on a previous power detection. In such an example, a sensor may have determined that a signal received was sufficiently powerful, but that signal was interference or noise and not a pen. Thus, in subsequent pen threshold detect stages, the threshold for passing the pen threshold detect stage may be higher or different based on previous measurements.

In some embodiments, the active pen spends substantially the same average amount of time broadcasting at each frequency. Thus, the power of the measured signal is substantially the same at each frequency. In some embodiments, the active pen broadcasts Manchester encoded data bits by shifting between the first and second frequency at a clock rate of approx. 2 kHz. Use of Manchester encoding ensures that the power of each signal is substantially similar over time.

Furthermore, the input device is configured to determine the same pen information at either frequency. In some embodiments, the Manchester encoded data broadcast by the active pen consists of 32 "half-bits", wherein half bits are half of a full bit. The encoded data begins with a four "half-bit" start condition followed by 14 "full bits" of data. In one embodiment, the 14 "full bit" value comprises: 8 bits for force information, 1 bit for Switch 1 data, 1 bit for Switch 2 data, 1 bit for Auxiliary Serial Data (e.g. a data stream for reporting low priority data such as battery state or pen serial number) and 3 bits for an inverted cyclic redundancy check (CRC). The CRC bits are inverted, this prevents data which has all 0s (e.g. 000) from having a 0 CRC and data which is all 1s (e.g. 111) from having a 1 CRC. Thus, for example, in a 32 half-bit sequence there may be fifteen 0 half-bits and seventeen 1 half-bits.

In some embodiments, the active pen may broadcast a different set of information if the pen is hovering above the input device or contacting the input device. In a hovering state, reporting of the force data to the pen is generally not necessary, thus the information provided by the pen would be without that information. For example, only three full bits of data are sent (Switch 1 and 2 and Auxiliary Serial Data) as 6 encoded half-bits, plus four half-bits of header. The same 10 half-bit sequence is sent four times—twice as is and then twice inverted.

In Step 470, a determination is made whether a signal has been detected above the noise, in accordance with one or more embodiments. The determination may be made in any manner now known or later developed. If a signal has not been detected, then the method proceeds to Step 495. If a signal has been detected, the method proceeds to Step 475.

In Step 475, pen/noise disambiguation and beat frequency detection is performed, in accordance with one or more embodiments. Step 475 may be performed in any manner now known or later developed. If a course frequency estimate is made, then the method proceeds to Step 499. If a vector of 32 peak delta ADC3 values is determined, then the method proceeds to Step 485. Otherwise, the method proceeds to Step 480.

In Step 480, a determination is made whether the signal is consistent with the pen, in accordance with one or more embodiments. If the signal is consistent with the pen, the method proceeds to Step 485.

In Step 485, an attempt is made to decode pen communications, in accordance with one or more embodiments. The communications may be decoded is any manner now known or later developed.

In Step 490, a determination is made whether the communications were successfully received. If the communications were not successfully received, the method proceeds to Step 495. If the communications were successfully received, then the method proceeds to Step 499.

In Step 499, the sensor switches to pen mode. The switch may be made in any manner now known or later developed. After the switch, the method may end.

In Step 495, the noise estimate for the frequency is updated, in accordance with one or more embodiments. The noise estimate may be updated in any manner now known or later developed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system for an input device, the processing system comprising:
   a sensor module coupled to sensor circuitry and configured to receive a first carrier signal comprising a first frequency and a second carrier signal comprising a second frequency broadcasted from an active pen,
   wherein the first carrier signal is present for each 0 data bit and absent for each 1 data bit during packet transmission, and
   wherein the second carrier signal is present for each 1 data bit and absent for each 0 data bit during packet transmission; and
   a determination module configured to:
   determine, based on the first carrier signal exceeding a power threshold, that the first carrier signal is boosted;
   transition, in response to the first carrier signal being boosted, from a first state to a contact state;
   reconstruct a first contact packet from the first carrier signal and the second carrier signal broadcasted by the active pen;
   determine an attribute of the active pen using the first contact packet;
   calculate an interference value corresponding to the first carrier signal broadcasted by the active pen;
   determine that the interference value satisfies an interference metric; and
   reconstruct, in response to the interference value for the first carrier signal satisfying the interference metric, a second contact packet from only the second carrier signal broadcasted by the active pen although the first carrier signal is still broadcasted by the active pen.

2. The processing system of claim 1, wherein the first state comprises one selected from a group consisting of a sleep state and a hover state.

3. The processing system of claim 1, wherein the determination module is further configured to:
   receive, prior to transitioning to the contact state, a hover packet from the active pen, wherein the hover packet is shorter than the contact packet.

4. The processing system of claim 1, wherein the first carrier signal and the second carrier signal are segments of a carrier signal modulated using frequency shift keying (FSK), and wherein the first carrier signal and the second carrier signal correspond to a plurality of bits encoded using Manchester encoding.

5. The processing system of claim 1, wherein the attribute for the active pen comprises one selected from a group consisting of a force value at a tip of the active pen, a button status of a button on the active pen, a battery level of a battery in the active pen, and a serial number of the active pen.

6. The processing system of claim 1, wherein the active pen comprises:
   a force sensor configured to:
   determine a first force value at a tip of the active pen, wherein the first force value is below a force threshold; and
   determine a second force value at the tip of the active pen, wherein the second force value is above the force threshold;
   a packet engine configured to generate:
   a hover packet in response to the first force value being below the force threshold; and
   the contact packet in response to the second force value being above the force threshold; and a transmitter configured to:
   transmit the first carrier signal and the second carrier signal; and
   boost, in response to the second force value being above the force threshold, a power level of the first signal for a pre-determined period.

7. A method, comprising:
receiving a first carrier signal comprising a first frequency and a second carrier signal comprising a second frequency broadcasted from an active pen,
   wherein the first carrier signal is present for each 0 data bit and absent for each 1 data bit during packet transmission, and
   wherein the second carrier signal is present for each 1 data bit and absent for each 0 data bit during packet transmission;
determining, based on the first carrier signal exceeding a power threshold, that the first carrier signal is boosted;
transitioning, in response to the first carrier signal being boosted, from a first state to a contact state;
reconstructing a first contact packet from the first carrier signal and the second carrier signal broadcasted from the active pen; and
determining an attribute of the active pen using the contact packet;
calculating an interference value corresponding to the first carrier signal broadcasted by the active pen;
determining that the interference value satisfies an interference metric; and
reconstructing, in response to the interference value for the first carrier signal satisfying the interference metric, a second contact packet from only the second carrier signal broadcasted by the active pen although the first carrier signal is still broadcasted by the active pen.

8. The method of claim 7, wherein the first state of the active pen comprises one selected from a group consisting of a sleep state and a hover state.

9. The method of claim 7, further comprising:
receiving, prior to transitioning to the contact state, a hover packet from the active pen, wherein the hover packet is shorter than the contact packet.

10. An active pen comprising:
a force sensor configured to:
   determine a first force value at a tip of the active pen, wherein the first force value is below a force threshold; and
   determine a second force value at the tip of the active pen, wherein the second force value is above the force threshold;
a packet engine configured to generate:
   a hover packet comprising an attribute of the active pen in response to the first force value being below the force threshold;
   a first contact packet comprising the attribute of the active pen and the second force value in response to the second force value being above the force threshold; and
   a second contact packet; and
a transmitter configured to:
   broadcast a first carrier signal and a second carrier signal to a processing system,
   wherein the first carrier signal is present for each 0 data bit and absent for each 1 data bit during packet transmission, and
   wherein the second carrier signal is present for each 1 data bit and absent for each 0 data bit during packet transmission; and
   boost, in response to the second force value being above the force threshold, a power level of the first carrier signal for a pre-determined period
   wherein the processing system reconstructs the first contact packet from the first carrier signal and the second carrier signal, and
   wherein the processing system reconstructs the second contact packet from only the second carrier signal although the first carrier signal is still broadcasted by the transmitter.

11. The active pen of claim 10, wherein the first carrier signal and the second carrier signal are segments of a carrier signal modulated using frequency shift keying (FSK), and wherein the first carrier signal and the second carrier signal correspond to a plurality of bits encoded using Manchester encoding.

12. The active pen of claim 10, wherein the power level of the first carrier signal is boosted by a factor of 2 during the pre-determined period.

13. The active pen of claim 10, wherein the attribute comprises one selected from a group consisting of a button status of a button on the active pen, a battery level of a battery in the active pen, and a serial number of the active pen.

14. The active pen of claim 10, wherein:
the first carrier signal and the second carrier signal are received by a sensor module of the processing system;
the sensor module is communicatively connected to a determination module of the processing system; and
the determination module is configured to:
   determine, based on the first carrier signal exceeding a power threshold, that the first carrier signal is boosted;
   transition, in response to the first carrier signal being boosted, from a hover state to a contact state;
   reconstruct the first contact packet from the first carrier signal and the second carrier signal broadcasted from the active pen; and
   determine the attribute of the active pen using the first contact packet calculate an interference value corresponding to the first carrier signal broadcasted by the active pen;
   determine that the interference value satisfies an interference metric; and
   reconstruct, in response to the interference value for the first carrier signal satisfying the interference metric, the second contact packet from only the second carrier signal broadcasted by the active pen although the first carrier signal is still broadcasted by the active pen.

15. The processing system of claim 1, wherein the determination module is further configured to:
report, in response to being in the first state, positional information for the active pen within a first time interval; and
report, in response to being in the contact state, position information for the active pen within a second time interval,
wherein the second time interval is shorter than the first time interval.

16. The method of claim 7, further comprising:
reporting, in response to being in the first state, positional information for the active pen within a first time interval; and
reporting, in response to being in the contact state, positional information for the active pen within a second time interval,
wherein the second time interval is shorter than the first time interval.

17. The active pen of claim 14, wherein the determination module is further configured to:
- report, in response to being in the hover state, positional information for the active pen within a first time interval; and
- report, in response to being in the contact state, positional information for the active pen within a second time interval,
- wherein the second time interval is shorter than the first time interval.

* * * * *